US006914117B2

(12) United States Patent
Bleys et al.

(10) Patent No.: US 6,914,117 B2
(45) Date of Patent: Jul. 5, 2005

(54) ELASTOMERIC POLYURETHANE MATERIAL

(75) Inventors: Gerhard Jozef Bleys, Heverlee (BE); Danny Anna Edward Geukens, Olen (BE); Hans Godelieve Guido Verbeke, Lubbeek (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/715,789

(22) Filed: Nov. 18, 2003

(65) Prior Publication Data

US 2004/0138390 A1 Jul. 15, 2004

Related U.S. Application Data

(63) Continuation of application No. PCT/EP02/04315, filed on Apr. 18, 2002.

(51) Int. Cl.$^7$ ............................................. C08G 18/76
(52) U.S. Cl. ............................................. 528/49; 528/67
(58) Field of Search ..................................... 528/49, 67

(56) References Cited

U.S. PATENT DOCUMENTS

| | | |
|---|---|---|
| 3,875,086 A | 4/1975 | Ramey et al. |
| 3,939,105 A | 2/1976 | Jones et al. |
| 3,939,123 A | 2/1976 | Matthews et al. |
| 3,940,542 A | 2/1976 | Knopf et al. |
| 4,241,537 A | 12/1980 | Wood |
| 4,379,105 A | 4/1983 | Taylor et al. |
| 4,404,296 A | 9/1983 | Schapel |
| 4,440,705 A | 4/1984 | Nissen et al. |
| 4,456,642 A | 6/1984 | Burgdorfer et al. |
| 4,466,936 A | 8/1984 | Schapel |
| 4,517,326 A | 5/1985 | Cordts et al. |
| 4,745,170 A | 5/1988 | Bushman et al. |
| 4,863,994 A | 9/1989 | Nelson et al. |
| 4,882,411 A | 11/1989 | Grogler et al. |
| 4,914,173 A | 4/1990 | Ansell |
| 4,950,695 A | 8/1990 | Stone |
| 4,966,953 A | 10/1990 | Shikinami et al. |
| 4,999,213 A | 3/1991 | Meyer |
| 5,000,955 A | 3/1991 | Gould et al. |
| 5,001,167 A | 3/1991 | Wiltz et al. |
| 5,017,625 A | 5/1991 | Ansell et al. |
| 5,028,636 A | 7/1991 | Gebauer et al. |
| 5,039,774 A | 8/1991 | Shikinami |
| 5,122,548 A | 6/1992 | Broos et al. |
| 5,159,012 A | 10/1992 | Doesburg et al. |
| 5,164,421 A | 11/1992 | Kiamil et al. |
| 5,183,664 A | 2/1993 | Ansell |
| 5,231,159 A | 7/1993 | Patterson et al. |
| 5,266,234 A | 11/1993 | Ho et al. |
| 5,354,835 A | 10/1994 | Blair |
| 5,360,885 A | 11/1994 | Orthmann et al. |
| 5,545,706 A | 8/1996 | Barksby et al. |
| 5,563,233 A | 10/1996 | Reich et al. |
| 5,631,319 A | 5/1997 | Reese et al. |
| 5,728,762 A | 3/1998 | Reich et al. |
| 5,817,860 A | 10/1998 | Rizk et al. |
| 5,844,013 A | 12/1998 | Kenndoff et al. |
| 5,880,167 A | 3/1999 | Krebs et al. |
| 5,889,065 A | 3/1999 | Kirchmeyer et al. |
| 5,929,167 A | 7/1999 | Gerard et al. |
| 5,968,995 A | 10/1999 | Rizk et al. |
| 6,022,937 A | 2/2000 | Adkins et al. |
| 2001/0018466 A1 | 8/2001 | Gansen et al. |
| 2001/0047047 A1 | 11/2001 | Nowalk et al. |

FOREIGN PATENT DOCUMENTS

| | | |
|---|---|---|
| CA | 122528 | 6/1987 |
| CA | 2137540 | 6/1995 |
| DE | 2347299 | 4/1975 |
| DE | 2521277 | 11/1976 |
| EP | 0095594 | 12/1983 |
| EP | 136396 | 4/1985 |
| GB | 1489052 | 10/1977 |
| GB | 2160881 | 1/1986 |
| GB | 2181736 | 3/1987 |
| GB | 2342654 | 4/2000 |
| JP | 60051707 | 3/1985 |
| JP | 60081220 | 5/1985 |
| JP | 60135421 | 7/1985 |
| JP | 602199220 | 11/1985 |
| JP | 61238816 | 10/1986 |
| JP | 63117088 | 5/1988 |
| JP | 1006017 | 1/1989 |
| JP | 1249820 | 10/1989 |
| JP | 4046918 | 2/1992 |
| JP | 4136015 | 5/1992 |
| JP | 4146916 | 5/1992 |
| JP | 52055161 | 8/1993 |
| JP | 5287046 | 11/1993 |
| JP | 5287047 | 11/1993 |
| JP | 5310882 | 11/1993 |
| JP | 6080758 | 3/1994 |
| JP | 6184265 | 7/1994 |
| JP | 6184266 | 7/1994 |
| JP | 7018045 | 1/1995 |
| JP | 7041541 | 2/1995 |
| JP | 7053661 | 2/1995 |
| JP | 7207051 | 8/1995 |
| JP | 7324161 | 12/1995 |
| JP | 8157552 | 6/1996 |
| JP | 8245743 | 9/1996 |
| JP | 8259657 | 10/1996 |
| JP | 9104736 | 4/1997 |
| JP | 9111114 | 4/1997 |
| JP | 9132634 | 5/1997 |
| JP | 10310627 | 11/1998 |
| JP | 11124424 | 5/1999 |
| JP | 2000026568 | 1/2000 |
| JP | 2000153264 | 6/2000 |
| JP | 2000313731 | 11/2000 |
| WO | WO 88/01878 | 3/1988 |
| WO | WO 93/04101 | 3/1993 |
| WO | WO 95/23172 | 8/1995 |
| WO | WO 95/23819 | 9/1995 |
| WO | WO 96/06874 | 3/1996 |
| WO | WO 01-57104 | 8/2001 |

Primary Examiner—Rachel Gorr
(74) Attorney, Agent, or Firm—Nicole Graham

(57) ABSTRACT

Process for preparing an elastomeric polyurethane material by reacting a polyisocyanate, a polyol and a monool.

20 Claims, No Drawings

US 6,914,117 B2

ELASTOMERIC POLYURETHANE MATERIAL

CROSS REFERENCE TO RELATED APPLICATIONS

This application is a continuation of international application PCT/EP02/04315, filed Apr. 18, 2002, and claims priority to EP 01112363.5, filed May 21, 2001.

FIELD OF THE INVENTION

The present invention relates to an elastomeric polyurethane material and to a process for making such materials. More in particular, the present invention is concerned with a very soft elastomeric polyurethane material and a process for making such materials using a monool.

BACKGROUND OF THE INVENTION

JP-07-324161 relates to the use of polyoxyalkylene monools as plasticizer in preparing a non-foam resin with improved vibration insulation over a range of temperatures.

U.S. Pat. No. 3,875,086 relates to the preparation of solid elastomers by reacting a polyisocyanate, a polyol and a monohydroxy polyether chain stopper to soften the elastomer. The elastomers made appear to contain a large amount of filler.

WO 01/57104 relates to the preparation of viscoelastic polyurethane foams using low molecular weight polyols and monool.

U.S. Pat. No. 4,863,994 relates to the manufacture of elastomers using a low amount of polyoxyalkylene monool. The monool appears to be used to prepare a monophase low viscosity blend of the polyols used.

SUMMARY OF THE INVENTION

The present invention is related to a process for preparing an elastomeric polyurethane material by reacting 1) a polymethylene polyphenylene polyisocyanate having an average isocyanate functionality of 2.4 or more, and preferably, 2.5–3.2, 2) a polymeric polyol having an average equivalent weight of at least 500, and preferably, of 700–2000 and an average nominal hydroxyl functionality of 2–4, and preferably, of 2, 3) a polymer having a nominal hydroxyl functionality of 1 and an average equivalent weight of at least 500, and preferably, of 500–3000, and 4) optionally using additives and auxiliaries known per se, wherein the reaction is conducted at an index of 90–110, and preferably, at an index of 98–102, and the equivalent amount of polymer 3) is 25–80%, and preferably, 35–70% of the available NCO equivalents.

Further, the present invention is concerned with an elastomeric polyurethane material made according to the above process.

Still further, the present invention is concerned with an elastomeric polyurethane material having a density of 500 kg/m$^3$ or more, a compression load deflection at 40% of 600 kPa or less, a resilience of 25% or less, which material preferably is free of plasticizer other than polymer 3). The materials are very soft materials, which may be used in transport/automotive interiors such in armrests and dashboards, in saddles of bicycles and motorbikes, and in mouse-pads and hand-rests for computers. Further, the materials show adhesive properties.

In the context of the present invention the following terms have the following meaning:
1) isocyanate index or NCO index or index:
   the ratio of NCO-groups over isocyanate-reactive hydrogen atoms present in a formulation, given as a percentage:

$$\frac{[NCO] \times 100}{[\text{active hydrogen}]}\%.$$

In other words, the NCO-index expresses the percentage of isocyanate actually used in a formulation with respect to the amount of isocyanate theoretically required for reacting with the amount of isocyanate-reactive hydrogen used in a formulation.

It should be observed that the isocyanate index, as used herein, is considered from the point of view of the actual polymerisation process preparing the elastomer involving the isocyanate ingredient and the isocyanate-reactive ingredients.
2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.
3) Reaction system: a combination of components wherein the polyisocyanates are kept in one or more containers separate from the isocyanate-reactive components.
4) The expression "polyurethane material" as used herein refers to cellular or non-cellular materials as obtained by reacting polyisocyanates with isocyanate-reactive hydrogen containing compounds, optionally using foaming agents, and may include cellular products obtained with water as reactive foaming agent (involving a reaction of water with isocyanate groups yielding urea linkages and carbon dioxide and producing polyurea-urethane foams).

DETAILED DESCRIPTION OF THE INVENTION

The present invention is related to a process for preparing an elastomeric polyurethane material by reacting 1) a poly- 5) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
6) The word "average" refers to number average unless indicated otherwise.
7) The term "hard block ratio" refers to the amount (in pbw) of polyisocyanate+isocyanate-reactive materials having a molecular weight of 500 or less (wherein polyols having a molecular weight of more than 500 incorporated in the polyisocyanates are not taken into account) divided by the amount (in pbw) of all polyisocyanate+all isocyanate-reactive materials used.

The polyisocyanate used in the invention is commonly known in the art as diphenylmethane diisocyanate (MDI) comprising homologues of diphenylmethane diisocyanate having an isocyanate functionality of 3 or more (polymethylene polyphenylene polyisocyanates). Such polyisocyanates are known in the art as polymeric or crude MDI. They are made by the phosgenation of a mixture of polyamines obtained by the acid condensation of aniline and formaldehyde. The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in such crude or polymeric MDI compositions determine the average functionality of the compositions, that is the average number of isocyanate groups per molecule. By varying the proportions of starting materials, the average functionality of the polyisocyanate compositions can be varied. The isocyanate functionality may be further increased by removing MDI. The average isocyanate functionality preferably ranges from 2.5–3.2. The NCO value of these polymeric or crude MDIs is at least 29% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation.

The polymeric polyol 2) used in the invention may be any of the polyols, or mixtures thereof, used in the manufacture of polyurethanes, having an average hydroxyl equivalent weight of at least 500, and preferably of 700–2000, and an average nominal hydroxyl functionality of 2–4, and preferably of 2. These polyols can be polyether polyols, polyester polyols, polyesteramides polyols, polythioether polyols, polycarbonate polyols, polyacetal polyols, polyolefin polyols, and the like.

Polyether polyols, which may be used, include products obtained by the polymerization of a cyclic oxide, for example ethylene oxide, propylene oxide, butylene oxide or tetrahydrofuran in the presence of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol and pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Copolymers having oxyethylene contents of 5–90% by weight, based on the weight of the polyol, which polyols may be block copolymers, random/block copolymers or random copolymers, are preferred. Mixtures of the said diols and triols can be particularly useful. Other particularly useful polyether polyols include polytetramethylene glycols obtained by the polymerization of tetrahydrofuran.

Polyester polyols that may be used include hydroxyl-terminated reaction products of polyhydric alcohols such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyesters obtained by the polymerization of lactones, for example caprolactone, in conjunction with a polyol, or of hydroxy carboxylic acids such as hydroxy caproic acid, may also be used.

Polyesteramides polyols may be obtained by the inclusion of aminoalcohols such as ethanolamine in polyesterification mixtures.

Polythioether polyols, which may be used, include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo- and copolymers and suitable polysiloxane polyols include polydimethylsiloxane diols and triols. Mixtures of polyols may be used as well.

Most preferred polyols are polyether polyols having a nominal hydroxyl functionality of 2, in particular polyoxyethylene polyoxypropylene diols having an oxyethylene content of 5–90% by weight, based on the weight of the diol, and an average equivalent weight of 700–2000.

Polymer 3, hereinafter also called 'monool' may be selected from monools having an equivalent weight of at least 500. Preferred monools are polyoxyalkylene monools having an equivalent weight of 500–3000, in particular such polyoxypropylene monools, polyoxyethylene monools and polyoxyethylene polyoxypropylene monools. Such monools are made by alkoxylation of a monohydric alcohol. Monohydric alcohols may be selected from branched and unbranched aliphatic, cycloaliphatic and aromatic alcohols, preferably having 1–20 carbon atoms and more preferably having 1–8 carbon atoms. Examples of aliphatic alcohols are methanol, ethanol, propanol, isopropanol, n-butanol, sec.-butanol, tert.-butanol, and the various isomers of pentyl alcohol, of hexyl alcohol, of octyl alcohol (for example 2-ethyl-hexanol), of nonyl alcohol, of decyl alcohol, of lauryl alcohol, of myristyl alcohol, of cetyl alcohol and of stearyl alcohol, as well as the fatty alcohols and wax alcohols which occur naturally or which can be obtained by the hydrogenation of naturally occurring carboxylic acids. Cyclohexanol and its homologues are examples of cycloaliphatic alcohols. Aromatic hydroxyl compounds, such as phenol, cresol, thymol, carvacrol, benzyl alcohol and phenylethanol, can also be employed. Most preferred are the above-mentioned aliphatic alcohols having 1–4 carbon atoms. If polymeric polyol 2) is a polyether polyol, this polymeric polyol 2) and polymer 3) may be made together, for example by oxyalkylating a mixture of one or more polyhydric alcohols and one or more monohydric alcohols. Most conveniently polymeric polyol 2) and polymer 3) are made separately and mixed when used.

Further, additives and auxiliaries known per se and conventionally used in the preparation of polyurethanes may be used. Examples of such additives and auxiliaries are blowing agents, chain-extenders, cross-linkers, catalysts enhancing the formation of urethane and/or urea groups, mould-release agents, plasticizers, pigments, fillers, like (hollow) microspheres, calcium carbonate, barium sulphate, carbon black, fumed silica and nanoclays; colorants, fire retardants, smoke suppressants, anti-microbial agents, antioxydants and superabsorbent polymers. Additives and auxiliaries are defined as any ingredient used in the process other than the polyisocyanate, the polymeric polyol and the monool.

The total amount of all additives and auxiliaries used in general is less than 20% by weight based on the weight of the polyisocyanate, the polymeric polyol 2) and the polymer 3), and preferably less than 10% by weight, and more preferably less than 5% by weight, and most preferably less than 2% by weight.

If a blowing agent is used it may be selected from those known in the art. Preferably, water is used. In order to obtain an elastomeric material having a density of 500 kg/m$^3$ or more the amount of water will be less than 1% by weight based on the weight of the polyisocyanate, the polymeric polyol 2) and the polymer 3), hereinafter called 'the 3 essential ingredients'. Preferably, no blowing agent is used.

Chain extenders are isocyanate-reactive compounds having 2 reactive hydrogen atoms and having a molecular weight below 1000, like ethylene glycol, butanediol and polyethylene glycol having a molecular weight below 1000. If used, the amount of chain extenders will not be more than 5% by weight based on the weight of the 3 essential ingredients. Preferably, they are not used.

Cross-linkers are isocyanate-reactive compounds having 3 or more reactive hydrogen atoms and an equivalent weight below 500, like glycerol, trimethylol propane, pentaerythritol, sucrose and sorbitol. If used, the amount of cross-linkers will not be more than 5% by weight based on the weight of the 3 essential ingredients. Preferably, they are not used.

Examples of above catalysts are tertiary amines and organo-metallic compounds known in the art, like those described in the ICI Polyurethanes Book, 2$^{nd}$ edition, 1990, by G. Woods, pages 41–45. If used the amount will not be more than 2% by weight based on the weight of the 3 essential ingredients. Preferably, the amount is 0.01–1% by weight based on the weight of the 3 essential ingredients.

Plasticizers may be selected from those known in the art like esters of polybasic (preferably dibasic) carboxylic acids with monohydric alcohols. Examples of such polycarboxylic acids are: succinic acid, isophthalic acid, trimellitic acid, phthalic acid anhydride, tetrahydrophthalic acid anhydride, hexahydrophthalic acid anhydride, endomethylene-tetrahydrophthalic acid anhydride, glutaric acid anhydride, maleic acid anhydride, fumaric acid and dimeric and trimeric fatty acids (such as oleic acid), which may be mixed with monomeric fatty acids. Branched and unbranched aliphatic alcohols having 1–20 carbon atoms, such as methanol, ethanol, propanol, isopropanol, n-butanol, sec.-butanol, tert.-butanol, and the various isomers of pentyl alcohol, of hexyl alcohol, of octyl alcohol (for example 2-ethyl-hexanol), of nonyl alcohol, of decyl alcohol, of lauryl alcohol, of myristyl alcohol, of cetyl alcohol and of stearyl alcohol, as well as the fatty alcohols and wax alcohols, which occur naturally or which can be obtained by the hydrogenation of naturally occurring carboxylic acids, are suitable monohydric alcohols. Cyclohexanol and its homologues are examples of cycloaliphatic alcohols. Aromatic hydroxyl compounds, such as phenol, cresol, thymol, carvacrol, benzyl alcohol and phenylethanol, can also be employed. An example of a widely used plasticizer is dioctyl-phthalate.

Phosphoric acid esters of the above-mentioned branched and unbranched aliphatic, cycloaliphatic and aromatic alcohols are also suitable as plasticizers. If appropriate, phosphates of halogenated alcohols, for example, trichloroethyl phosphate, can also be employed. Such phosphates of halogenated alcohols are particularly advantageous in that they also impart a flame-retarding finish. Of course, mixed esters of the above-mentioned alcohols and carboxylic acids can also be employed.

So-called polymeric plasticizers can also be employed. Polyesters of adipic acid, sebacic acid or phthalic acid are examples of such commercial polymeric plasticizers. Phenol alkysulfonates, for example phenyl paraffinsulfonates, can also be used as plasticizers. If used, the amount is less than 5% by weight and preferably less than 2% by weight based on the weight of the 3 essential ingredients. One of the surprising findings of the present invention is that good quality, very soft elastomeric materials can be made without using plasticizers other than polymer 3). The advantage of this is that no leaching of such other plasticizers can occur, as such leaching has been claimed to be the cause of certain health problems. Avoiding such leaching further reduces the amount of fogging of windows of cars when the elastomeric material is used in the interior of the car. Still further, avoidance of leaching provides for a more consistent quality (softness) of the material over time. Therefore, most preferably no plasticizer other than polymer 3) is used.

The materials are made by combining the ingredients and allowing them to react. It may be advantageous to premix all polyol 2), polymer 3) and, if used, additives and auxiliaries and to combine this mixture with the polyisocyanate and allow to react.

The materials may be made according to the prepolymer method or the one-shot method. The one-shot method is preferred. The materials may be made in an open container, on a conveyor belt and in an open or a closed mould. When made in a mould, the materials may be made according to the reaction injection moulding process and the cast moulding process.

The materials obtained have 1) a density of 500 kg/m³ or more (DIN 53420); preferably they are non-blown, 2) a compression load deflection at 40% (DIN 53577) of 600 kPa or less and preferably of 10–300 kPa, 3) a resilience (ISO 8307) of 25% or less and preferably of 0–15% and 4) preferably have a hardblock ratio of less than 0.30 and more preferably of 0.05 to 0.20; preferably these materials are free of plasticizer other than polymer 3) and most preferably these materials contain only catalyst in an amount of 0.01–1% by weight based on the weight of the material.

The elastomeric materials according to the present invention are soft, gel-like materials with a certain degree of stickiness. Their Shore A hardness preferably is at most 5 as measured according to DIN 53505 and more preferably at most 3 and most preferably at most 1. Because the materials are most preferably made as close as possible to index=100 and because the materials are most preferably made while using as little as possible of auxiliaries and additives, the materials have reduced amounts of leachable products and reduced numbers of remaining reactive groups. At higher index, e.g. 120, the materials become harder while at lower index, e.g. 85, a liquid paste is obtained.

6) Polyisocyanate 1: Polymeric MDI having an NCO value of 30.7% by weight and an isocyanate functionality of 2.7.
7) Polyisocyanate 2: Polymeric MDI having an NCO value of 30.35% by weight and an isocyanate functionality of 2.9.
8) Diaminobicyclooctane as catalyst in an amount of 0.25% by weight on the amount of diol used.

The polyol and monool were premixed and then mixed with the polyisocyanate and allowed to react in open reaction cup. The following physical properties have been measured/determined:

monool content, %: equivalent amount of monool as a percentage of the available amount of NCO equivalents index: calculated hard block ratio: calculated stickiness: based on hand-feel;

0 is not sticky at all;

10 is extremely sticky compression load deflection at 40% (CLD), kPa: DIN 53577 resilience, %: ISO 8307

The results are shown in Table 1.

TABLE 1

(pbw = parts by weight)

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polyol 1, pbw | — | — | — | — | 33.0 | 29.7 | — | — | — | — | — | 39.9 |
| Polyol 2, pbw | 36.5 | 43.3 | 39.6 | 35.6 | — | — | 36.1 | 32.7 | 41.3 | 36.1 | 32.7 | — |
| Monool 1, pbw | 51.9 | — | — | — | — | — | — | — | — | — | — | — |
| Monool 2, pbw | — | 45.1 | 48.7 | 52.4 | — | — | — | — | — | — | — | — |
| Monool 3, pbw | — | — | — | — | 57.1 | 60.5 | 54.5 | 58.0 | 49.1 | 54.5 | 58.0 | 50.0 |
| Polyisocyanate 1, pbw | — | — | — | — | — | — | — | — | — | — | — | 10.1 |
| Polyisocyanate 2, pbw | 11.6 | 11.6 | 11.6 | 11.7 | 9.9 | 9.8 | 9.5 | 9.4 | 9.6 | 9.5 | 9.4 | — |
| monool content, % | 62 | 54 | 58 | 62 | 54 | 58 | 54 | 58 | 48 | 54 | 58 | 46 |
| index | 100 | 100 | 100 | 100 | 100 | 100 | 100 | 100 | 100 | 100 | 100 | 100 |
| hardblock ratio | 11.6 | 11.6 | 11.6 | 11.7 | 9.9 | 9.8 | 9.5 | 9.4 | 9.6 | 9.5 | 9.4 | 10.1 |
| stickiness | 2 | 5 | 6 | 10 | 9 | 10 | 6 | 6 | 2 | 6 | 6 | 10 |
| CLD | 56 | 80 | 43 | 17 | 38 | 17 | 31 | 15 | 93 | 31 | 15 | 26 |
| resilience | ND | ND | ND | ND | 7 | 4 | 7 | 3 | 7 | 7 | 3 | 5 |

ND = not determined

EXAMPLES

The invention is illustrated by the following non-limiting examples:

Ingredients Used:

1) Polyol 1: a polyoxyethylene polyoxpropylene diol having a molecular weight of 2000, an oxyethylene content of about 73% by weight (all random) and a primary hydroxyl content of about 51%.
2) Polyol 2: a polyoxyethylene polyoxypropylene diol having a molecular weight of 2300 and an oxyethylene content of 15% by weight (all capped).
3) Monool 1: monomethoxylated polypropylene glycol having a molecular weight of 1000.
4) Monool 2: monomethoxylated polyoxyethylene polyoxypropylene diol having a molecular weight of about 985 and an oxyethylene content of about 64% by weight (all random).
5) Monool 3: monomethoxylated polyoxyethylene polyoxypropylene diol having a molecular weight of about 1475 and an oxyethylene content of about 66% by weight (all random).

What is claimed:

1. A process for preparing an elastomeric polyurethane material having a shore A hardness of at most 5 (DIN 53505), a density of 500 kg/m³ or more (DIN 53420), a compression load deflation at 40% (CLD) of 600 kPa or less (DIN 53577), and a resilience of 25% or less (ISO 8307) comprising the step of reacting:

1) a polymethylene polyphenylene polyisocyanate having an average isocyanate functionality of 2.4 or more,
2) a polymeric polyol having an average equivalent weight of at least 500 and an average nominal hydroxyl functionality of 2–4,
3) a polymer having a nominal hydroxyl functionality of 1 and an average equivalent weight of at least 500, and
4) optional additives and auxiliaries known per se in an amount of less than 5% by weight (based on the weight of the polyisocyanate, polymeric polyol 2) and polymer 3)), wherein the reaction is conducted at an index of 90–110 and the equivalent amount of polymer 3) is 25–80% of the available NCO equivalents.

2. The process according to claim 1 wherein the average isocyanate functionality is 2.5–3.2, the polymeric polyol 2) has an average equivalent weight of 700–2000 and an average nominal hydroxyl functionality of 2, the polymer 3) has an average equivalent weight of 500–3000, and wherein the index is 90–110 and the equivalent amount of polymer 3) is 35–70% of the available NCO equivalents.

3. The process according to claim 1 wherein no plasticizer is used other than polymer 3).

4. The process according to claim 2 wherein no plasticizer is used other than polymer 3).

5. The process according to claim 1, wherein a catalyst is used in an amount of 0.01–1% by weight based on the weight of the polyisocyanate, polymeric polyol 2) and polymer 3).

6. The process according to claim 2, wherein a catalyst is used in an amount of 0.01–1% by weight based on the weight of the polyisocyanate, polymeric polyol 2) and polymer 3).

7. The process according to claim 3, wherein a catalyst is used in an amount of 0.01–1% by weight based on the weight of the polyisocyanate, polymeric polyol 2) and polymer 3).

8. The process according to claim 1, wherein the polymeric polyol 2) is a polyether diol and the polymer 3) is a polyoxyalkylene monool.

9. The process according to claim 2, wherein the polymeric polyol 2) is a polyether diol and the polymer 3) is a polyoxyalkylene monool.

10. The process according to claim 3, wherein the polymeric polyol 2) is a polyether diol and the polymer 3) is a polyoxyalkylene monool.

11. The process according to claim 5, wherein the polymeric polyol 2) is a polyether diol and the polymer 3) is a polyoxyalkylene monool.

12. The process according to claim 1 wherein the index is 98–102.

13. The process according to claim 2 wherein the index is 98–102.

14. The process according to claim 1 wherein less than 2% by weight, (based on the weight of the polyisocyanate, polymeric polyol 2) and polymer 3)), of additives and auxiliaries is used.

15. The process of claim 1 wherein the material is non-blown, the CLD is 10–300 kPa and the resilience is 0–15%.

16. The process of claim 2 wherein the material is non-blown, the CLD is 10–300 kPa and the resilience is 0–15%.

17. The process of claim 3 wherein the material is non-blown, the CLD is 10–300 kPa and the resilience is 0–15%.

18. The process of claim 1 wherein the hard block ratio is 0.05–0.20 and the Shore A hardness is at most 3 (DIN 53505).

19. The process of claim 2 wherein the hard block ratio is 0.05–0.20 and the Shore A hardness is at most 3 (DIN 53505).

20. An elastomeric polyurethane material having a shore A hardness of at most 5 (DIN 53505), a density of 500 kg/m$^3$ or more (DIN 53420), a compression load deflation at 40% (CLD) of 600 kPa or less (DIN 53577), and a resilience of 25% or less (ISO 8307) comprising the reaction product of:

1) a polymethylene polyphenylene polyisocyanate having an average isocyanate functionality of 2.4 or more,
2) a polymeric polyol having an average equivalent weight of at least 500 and an average nominal hydroxyl functionality of 2–4,
3) a polymer having a nominal hydroxyl functionality of 1 and an average equivalent weight of at least 500, and
4) optional additives and auxiliaries known per se in an amount of less than 5% by weight (based on the weight of the polyisocyanate, polymeric polyol 2) and polymer 3)), wherein the reaction is conducted at an index of 90–110 and the equivalent amount of polymer 3) is 25–80% of the available NCO equivalents.

* * * * *